July 5, 1949.　　　　　H. C. HAYES　　　　　2,474,842
INDICATOR
Filed Dec. 31, 1940　　　　　　　　　　　　3 Sheets-Sheet 1
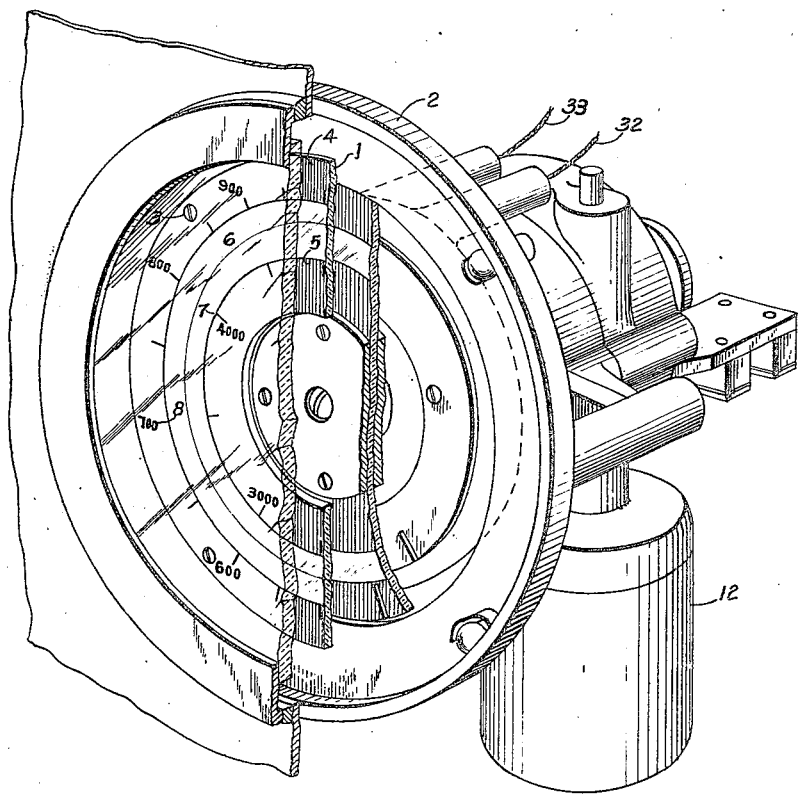
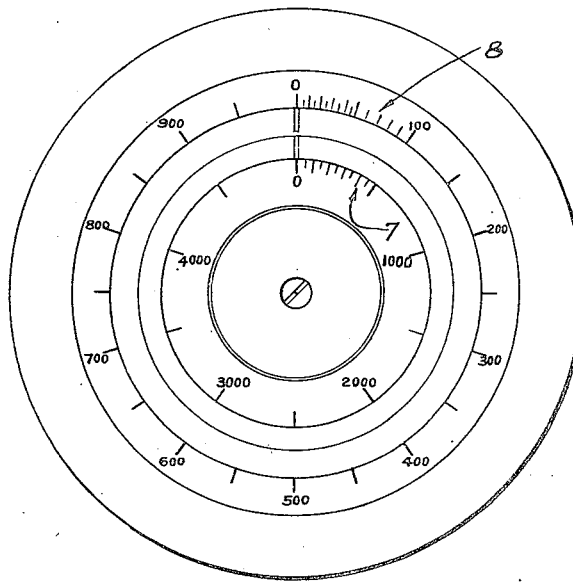
INVENTOR
Harvey C. Hayes
BY
ATTORNEY

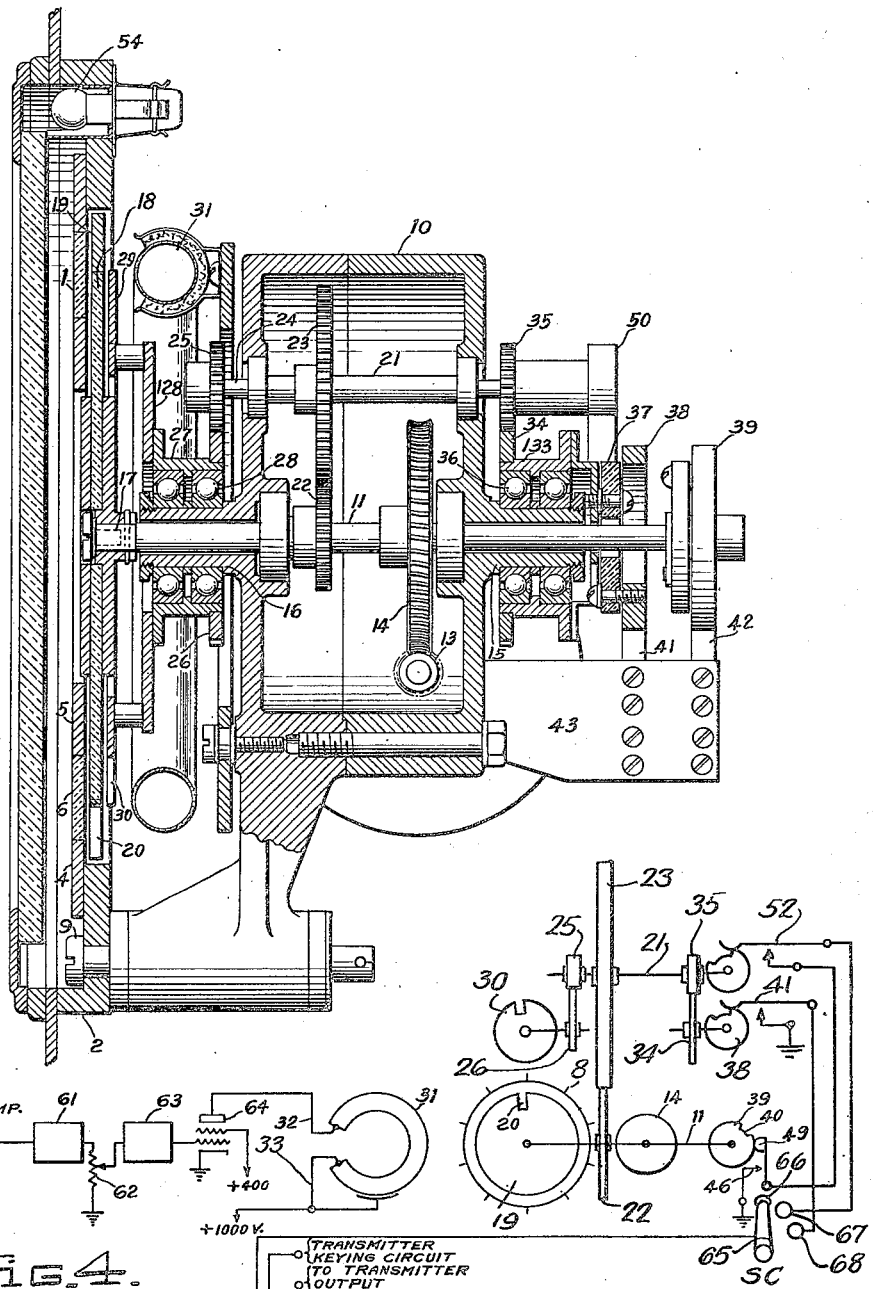

July 5, 1949.  H. C. HAYES  2,474,842
INDICATOR

Filed Dec. 31, 1940  3 Sheets—Sheet 3

INVENTOR
Harvey C. Hayes
BY
ATTORNEY

Patented July 5, 1949

2,474,842

UNITED STATES PATENT OFFICE 2,474,842

INDICATOR

Harvey C. Hayes, Washington, D. C.

Application December 31, 1940, Serial No. 372,657

8 Claims. (Cl. 161—15.2)

(Granted under the act of March 3, 1883, as amended April 30, 1928; 370 O. G. 757)

This invention relates to an indicating means for use with an echo-ranging system utilizing the reflections of radiant energy from a target to measure its distance from an observer.

It is an object of this invention to provide an indicating means which will simultaneously produce a coarse and a fine indication of range on separate scales with the use of a single driving motor.

It is a further object of this invention to provide an indicator which will simultaneously produce on a pair of scales a clear-cut flashing indication of a recurring nature with the use of a single light source.

Referring now to the drawings:

Fig. 1 is a perspective view of an indicator constructed according to the invention with a portion of the dial and masking means broken away.

Fig. 2 is an elevational view looking from directly in front of the dial face.

Fig. 3 is an elevational view in cross-section taken along the vertical plane extending normal to and bisecting the dial of the indicator shown in Fig. 1.

Fig. 4 is a diagrammatic view of certain elements of the indicator showing the arrangement of the flashing and transmitter keying circuits.

Figure 5:
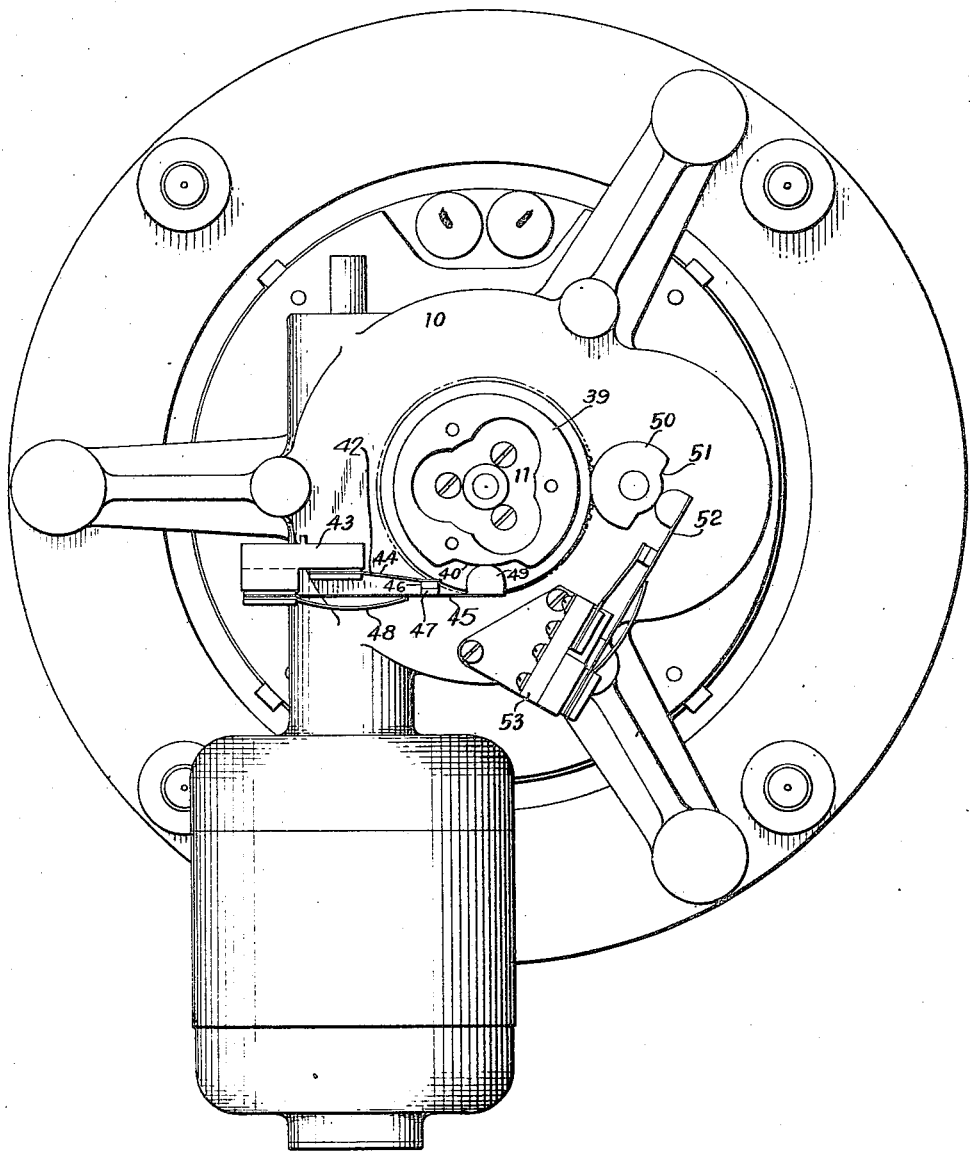
Fig. 5 is an elevational view looking from the rear of the indicator.

The above figures illustrate an embodiment of the invention adapted to underwater-sound echo-ranging.

The reference numeral 1 indicates a dial preferably constructed of transparent material and rigidly mounted on a ring 2 to which it is secured by screws 3. The dial face is divided into 3 annular sections, the outer of which is formed by an annular opaque strip 4 formed adjacent to the outer periphery of the dial and the inner of which is formed by an opaque annular band or strip 5 formed adjacent the central portion of the dial, the center of the dial having a round hole formed therein. The section 6 between the annular strips 4 and 5 remains transparent. Inscribed on the face of the dial adjacent to the outer periphery of the inner strip 5 is a range scale 7 which is shown extending from zero to 5000 yards. Inscribed on the inner periphery of the outer strip 4 is a similar scale 8 which extends from zero to 1000 yards thus constituting a vernier for the scale 7. The zero marks of both scales lie on the same radial line. Secured to the back of the ring 2 by bolts 9 is a metallic housing 10 enclosing a shaft 11. This shaft is driven by a constant speed electric motor 12 by means of a worm 13 and a worm wheel 14. The shaft 11 is supported in the housing 10 by means of bearing sleeves 15 and 16, the shaft being so mounted that it extends co-axially with respect to the dial 1.

Secured to the end of shaft 17, an extension of shaft 11, is a disc 18, preferably of transparent material. However, formed on the face of said disc adjacent to the outer periphery thereof is an opaque annular strip 19, lying directly behind the outer half of the transparent section 6 of dial 1. Formed in this opaque section 19 is a slit 20 extending in a radial direction.

In the present embodiment of the invention, the speed of the motor 12 and ratio of the gears 13—14 are so chosen that the shaft 11 and consequently the light slit 20 are driven at a rate of one revolution per unit time interval required for sound to travel through water a distance of 1,000 yards and back, or approximately one and 1 quarter seconds.

Carried also by the housing 10 is a shaft 21 extending parallel to the shaft 11. This shaft is driven from shaft 11 by means of gears 22 and 23. On the end 24 of shaft 21 is fixed a gear 25 which drives by means of gear 26 a sleeve 27 mounted coaxially of shaft 11 and supported for rotation about the periphery of bearing sleeve 16 by means of ball bearings 28. Mounted on the forward face of sleeve 27 is a disc 128 carrying adjacent its forward face an annular disc 29 of opaque material. The outer periphery of this disc extends to a point directly behind the mid-point of the transparent section 6 of dial 1. Formed in the periphery of disc 27 is a radial slot 30 similar to slot 20 of disc 18.

The gear ratio between shafts 11 and 21 is such that the disc 18 rotates 5 times as fast as disc 29. Mounted on the forward face of housing 10 and supported so as to be coaxial with shaft 11 is an annular neon light 31. This light is connected by means of leads 32 and 33 with the output of the receiver of the echo-ranging system as indicated in Fig. 4. It will be readily seen that the outer opaque portion 19 of the disc 18 constitutes a masking means interrupting the passage of light from light 31 to the outer portion of the annular transparent section 6 of the dial 1 and that disc 29 constitutes a masking means cutting off the passage of light from light 31 to the remainder or inner portion of the transparent section 6 of dial 1.

Mounted on the outer periphery of the bearing sleeve 15 is a sleeve 133 having mounted thereon a ring gear 34 which is driven by gear 35 mounted on the after end of shaft 21. The sleeve 133 is supported for rotation about sleeve 15 by ball bearings 36. Secured to the after end of sleeve 33 is a disc 37 having secured thereto a cam 38 having a depression (not shown) formed at one point of its periphery. Secured to the after end of shaft 11 in a similar fashion for rotation therewith is a cam 39 likewise having a similar depression 40 formed in one portion of its periphery. Co-acting with these cams are a pair of cam switches 41 and 42 carried by plate 43 which is secured to the after edge of housing 10. A side view of cam switch 42 is clearly shown in Fig. 5, cam switch 41 being of identical construction. Switch 42 consists of arm 44 and arm 45, both arms being constructed of springy material and each carrying a contact point 46 and 47, respectively. Arm 45 is spring-pressed toward arm 44 by means of spring 48. Arm 45 carries at its end a cam follower 49 which when riding on the periphery of cam 39 is so positioned as to separate contact points 46 and 47 and when riding in the depression 40 allows contact between points 46 and 47.

The orientation of cam 39 is such that cam switch 42 will be closed and then opened each time the slit 20 passes the zero mark of the vernier range scale 8, to close the keying circuit of the echo ranging system or otherwise establish the beginning of a time interval to be measured by rotation of the slit 20. The speed of sleeve 33 is equal to the speed of sleeve 27 and the orientation of cam 38 is such that the cam switch 41 will be closed and then opened each time the slit 30 of disc 29 passes the zero mark of range scale 7.

Fixed on the after end of shaft 21 is a cam 50 best shown in Fig. 5. The cam 50 has a recess 51 formed in its outer periphery. A cam switch 52 similar to switches 41 and 42 is mounted upon a plate 53 fixed to the after end of housing 10. The speed of cam 50 is such that the switch 52 will close every alternate time that the slit 20 passes the zero point of vernier range scale 8. Cam switch 52 may be used in series with the cam switch 42 so as to render the switch 42 ineffective during alternate revolutions of the high speed disk 18 and slit 20.

The face of the dial is edge illuminated by means of a lamp 54 carried adjacent the periphery of dial 1.

The transmitter keying and lamp flashing circuits are shown in Fig. 4. In this figure, the disc 19 bearing slot 20 is diagrammatically shown, together with the shaft 11 to which it is secured and the cam 39 secured to the opposite end of shaft 11. The disc 19 cooperates with outer scale 8 on the face of the dial and the cam 39 is so oriented on the shaft 11 as to effect closure of contact 46 and cause the keying of the transmitter each time the slot 20 passes the zero point of scale 8. When this occurs the follower 49 rides into depression 40 on the periphery of cam 39, thus completing at 46 the energizing circuit of relay 55. The actuation of this relay completes a contact between arm 56 and contact point 58 and between arm 57 and contact point 59 and at the same time breaks contact between arm 57 and contact point 60. Contact points 58 and 59 are so positioned that contact will be made between arm 57 and contact point 59 before it is made between arm 56 and contact point 58. The opening of the circuit at the contact point 60 serves to disconnect the receiver from the projector. The closing of the circuit at contact point 58 starts the keying action of the transmitter, and the closing of the circuit at contact point 59 having connected the transmitter output to the projector. Thus each time the slot 20 passes the zero point of scale 8 the transmitter is keyed, the receiver being disconnected from the projector at the same time. Upon the completion of the keying action which is terminated by the riding up of follower 49 on the periphery of cam 39 the relay 55 is de-energized and the receiver is again connected to the projector.

Neon lamp 31 is connected to the output of the receiver by means of a circuit fed from the I. F. amplifier of the receiver through diode rectifier 61, variable resistance 62, D. C. amplifiers 63 and 64.

The various circuit and apparatus components and their cooperative relations just described in reference to Fig. 4, are those involved in timing with the high speed disc or light slit 20, as where distances within 1,000 yards are to be measured.

Where distances of greater than 1,000 yards and less than 2,000 yards are to be measured then, as mentioned above, the switch 52 is put in series with contact 46 as by swinging the wiper arm 65 of a suitable circuit changing switch SC from a contact 66 to a contact 67 connected as shown in Fig. 4. Where distances up to 5,000 yards are to be measured the cam switch 41 synchronized with light slit 30 may be substituted, so that it alone will control the keying circuit, by swinging the switch arm 65 onto contact 68.

In operation, assuming a range is being taken on a target within 1,000 yards, the circuit changing switch SC is set as shown in Fig. 4 with the switch arm 65 on contact 66. Under this condition the transmitter will be keyed to effect a momentary transmission in the form of a short train of waves usually referred to as a pulse, each time the slit 20 passes the zero mark on the scale 8. With the target at say 400 yards, the echo of the first pulse will reach the receiver to flash the lamp when slit 20 arrives at the 400 mark on scale 8 thus indicating a range of 400 yards. Then there will be no further flashing of the lamp until after slit 20 has again passed the zero mark, to key the transmitter and thus transmit another pulse whose echo will likewise reach the receiver to flash the lamp when slit 20 again arrives at 400. Thus there will be repeated range indications of 400 yards unless the range increases or decreases in which case the indication will vary accordingly. In the meantime, during such repeated range indications of say 400 yards, the slit 30 will, of course, be illuminated at successive points on the dial 7 representing 400 yards, 1400 yards and so on to 4,400 yards according to which whole thousands mark the slit 30 is at when the incident pulse is sent.

Where the target is between 1,000 and 2,000 yards distant, the circuit changing switch SC is set with the arm 65 on contact 67 to put the cam operated contact 52 in series with contact 46. Under these conditions the transmitter will be keyed to transmit a short wave-train or pulse every second time the slit 20 passes the zero mark. With the target at say 1,800 yards the echo of the first transmitted pulse will reach the receiver to flash the lamp when the slit 20 arrives at the mark 800 on the scale 8 the second time after transmission of the pulse and thereafter each second time around indicating 1,000 plus 800 or 1,800 yards. In the meantime the slit 30 will be momentarily illuminated at 1,800 or some number equal to a multiple of 1,000, plus 800, on the scale 7, according as to what thousands mark the slit 30 is at when the last pulse is sent. However, when ranging between 1,000 and 2,000 yards, the indicator light slit 30 need not be given much attention.

When ranges above 2,000 yards are to be measured, the switch arm 65 is placed on contact 68 giving cam switch 41 sole control of the keying. Under this condition pulses are transmitted only upon each movement of the slit 30 past the zero mark. Thus where the target is at a distance of say 3,850 yards, the transmitter having been keyed to transmit a pulse when the switch 30 was last at zero (slit 20 necessarily being at zero at that time) the echo of the first pulse will not reach the receiver to flash the lamp until the slit 30 arrives at a point on the dial 7 corresponding to 3,850 yards at which time the slit 20 will have made three complete revolutions and will be at 850 on dial 8. Thus not only will the slit 30 flash at a point on dial 7 beyond 3,000 and near but below 4,000 to enable an observer to estimate a range of 3,800 plus, but the flashing of slit 20 at the 850 mark will render possible a more nearly exact reading down to the tens digit and a fair estimate of the units value.

While the disclosure of this application has been restricted to a single embodiment, the scope of the invention is not to be considered as restricted thereby but only by the scope and limitations of the appended claims.

The invention described herein may be manufactured and/or used by or for the Government of the United States of America for governmental purposes without the payment of any royalties thereon or therefor.

I claim:

1. A time measuring and indicating device comprising a shaft driven at a constant rate of speed, an annular light source so constructed and arranged as to be illuminated by the reception of a signal, a dial mounted in front of said light source, said dial having an annular transparent section, a pair of circular masking means, each masking one only of two adjacent annular portions of said annular section from said light source, said masking means being rotated by said shaft at speeds, one a multiple of the other, each of said masking means forming a substantially continuous masking area except for a radial slit formed therein visible adjacent a border of said transparent section from the front of said dial, said dial, said masking means and said light source being coaxially mounted and mutually parallel, a pair of scales inscribed on said dial along the inner and outer borders, respectively, of said transparent annular section, one of said scales being a vernier of the other and means actuated by said shaft to establish the beginning of a time interval at regular intervals when the slit adjacent said vernier scale is opposite the zero or other predetermined mark of its scale.

2. A time measuring and indicating device comprising a circular dial having an annular transparent section concentric with the dial, an annular light source positioned behind said dial and arranged to be illuminated by the reception of a signal, a pair of masking means positioned between said dial and said light source, each of said masking means being so shaped as to mask a different annular portion of said annular transparent section, each adjacent one edge thereof, for illumination by said light source, each said masking means having a radial slit formed therein and masking substantially the entire area of said annular transparent section not masked by the other masking means except for the portion uncovered by the slit, a main scale inscribed on said dial along one endge of said transparent section, a second scale constituting a vernier to said main scale inscribed on said dial along the other edge of said transparent section, means to rotate said masking means at different fixed rates of speed respectively, the one associated with the vernier scale having the higher rate, and means actuated by said rotating means to establish the beginning of a time interval at regular intervals when the slit adjacent said vernier scale is opposite the zero or other predetermined mark of said scale.

3. A time measuring and indicating device comprising a dial having an annular transparent section, a scale inscribed on said dial along the inner periphery of said section, a vernier scale comprising an expansion of one of the units of said first-mentioned scale inscribed on said dial along the outer periphery of said section, an annular light source constructed and arranged to be illuminated by the reception of a signal, said source being located behind said dial and coaxially mounted with respect to said section, a pair of masking means, each so shaped and located as to mask a different annular portion of said section adjacent to one of the peripheries thereof from illumination by said light source, each of said masking means having formed therein an aperture and masking substantially the entire area of the said annular transparent section not masked by the other masking means except for the portion uncovered by the aperture for the passage of light, whereby light from said source passing through said aperture is visible from in front of said dial, means to rotate said masking means at different fixed speeds, respectively, the one associated with the vernier scale having the higher rate, and means actuated by said rotating means to establish the beginning of a time interval at regular intervals when the aperture adjacent said vernier scale is opposite the zero reading of its scale.

4. A time measuring and indicating device comprising a dial having an annular transparent section, a scale inscribed on said dial along the inner periphery of said section, a vernier scale comprising an expansion of one of the units of said first-mentioned scale inscribed on said dial along the outer periphery of said section, a light source constructed and arranged to be illuminated by the reception of a signal, said light source being located behind said dial and so mounted as to illuminate all of said section, a pair of masking means each so shaped and located as to mask an annular portion of said section adjacent to one of the peripheries thereof from illumination by said light source, each of said masking means having formed therein an aperture and masking substantially the entire area of the said annular transparent section not masked by the other masking means except for the portion uncovered by the aperture for passage of light, whereby light from said source passing through said aperture is visible from in front of said dial, means to rotate said masking means at different fixed speeds, respectively, such that each of said apertures will traverse an interval of time indication with respect to its scale in a given time, and means actuated by said rotating means to establish the beginning of a time interval at regular intervals when the aperture adjacent said vernier scale is opposite the zero reading of its scale.

5. A time measuring and indicating device comprising a dial, a pair of spaced-apart scales formed on said dial, a single light source arranged to be rendered effective by the reception of a signal, a pair of masking means, each so shaped and located as to mask the entire area of a portion of said dial adjacent one of said scales from illumination by said source, the remaining portion of the dial being unilluminated by said source, each said masking means having an aperture formed therein for the passage of light from said source and so arranged as to be visible adjacent one of said scales from in front of said dial, means for moving said masking means so that said apertures traverse equal intervals of time indication in a given time and means driven by said moving means to establish the beginning of a time interval in synchronism with the movement of one of said apertures past a reference point of its scale.

6. A time measuring and indicating device comprising a dial having an annular transparent section, an annular light source positioned behind said dial and arranged to be rendered effective by the reception of a signal, a pair of masking means positioned between said dial and said light source, each of said masking means being so shaped as to mask from illumination by said light source an annular portion of said annular transparent section adjacent one edge thereof and to mask substantially the entire remaining area of the transparent section not masked by the other, each said masking means having a radial slit formed therein and visible from the front of said dial, a main scale inscribed on said dial along one edge of said transparent section, a second scale constituting a vernier to said main scale inscribed on said dial along the other edge of said transparent section, means to rotate said masking means at different rates of speed, respectively, the ratio of said speeds being such as to cause each of said slits to traverse equal intervals of time indication, and means synchronizing the establishment of the beginning of a time interval with the movement of said masking means.

7. A time measuring and indicating device comprising a dial having an annular transparent section, a scale inscribed on said dial along the inner periphery of said section, a vernier scale comprising an expansion of one of the units of said first-mentioned scale on said dial along the outer periphery of said section, a light source constructed and arranged to be rendered effective by the reception of a signal, said light source being located behind said dial and so mounted as to illuminate all of said section, a pair of masking means, each so shaped and located as to mask from illumination by said light source an annular portion of said section adjacent to one of the peripheries thereof and to mask substantially the entire remaining area of the transparent section not masked by the other, each of said masking means having formed therein an aperture for passage of light, whereby light from said source passing through said aperture is visible from in front of said dial, means to rotate said masking means at different fixed speeds, respectively, such that each of said apertures will traverse the same interval of time indication with respect to its scale in a given time, and means synchronizing the establishment of the beginning of a time interval with the movement of said masking means.

8. A time measuring and indicating device comprising an annular light source so constructed and arranged as to be rendered effective upon the reception of a signal, a dial mounted in front of said light source, said dial having an annular transparent section, a main scale inscribed on said dial adjacent to the inner periphery of said section, a vernier scale inscribed on said dial adjacent to the outer periphery of said section, said vernier scale constituting an expanded unit of said main scale, a shaft mounted coaxially with respect to said dial and said light source, a masking means mounted on said shaft for rotation therewith and so shaped and disposed as to mask from illumination by said light source an annular portion of said section adjacent to the outer periphery thereof from illumination by said light source, a masking means mounted coaxially with respect to said shaft, means driven by said shaft for rotating said last-named masking means at a speed different from but proportional to the speed of said shaft, said light masking means being so shaped and positioned as to mask an annular portion of said section adjacent the inner periphery thereof from illumination by said light source and to mask substantially the entire remaining area of the transparent section not masked by the other, an aperture for the passage of light from said source formed in each of said masking means so placed as to be visible from in front of said dial, adjacent to the scale with which said masking means is associated and means actuated by said driving means to establish the beginning of a time interval at regular intervals when the one of said apertures adjacent said vernier scale is passing the zero mark of said scale, the speeds of said masking means being so selected that both of said apertures traverse equal intervals of time indication with respect to the scale with which each is associated in the same period of time.

HARVEY C. HAYES.

REFERENCES CITED

The following references are of record in the file of this patent:

UNITED STATES PATENTS

| Number | Name | Date |
| --- | --- | --- |
| 1,972,889 | Hayes | Sept. 11, 1934 |
| 2,009,209 | Scantlebury | July 23, 1935 |
| 2,009,449 | Hedley | July 30, 1935 |
| 2,032,893 | Settegast | Mar. 12, 1936 |
| 2,054,109 | Williams | Sept. 15, 1936 |
| 2,071,284 | Hyland | Feb. 16, 1937 |
| 2,098,287 | Gent | Nov. 9, 1937 |
| 2,118,518 | Neuman | May 24, 1938 |

OTHER REFERENCES

Article, "The Dorsey Fathometer," Journal of the Washington Academy of Sciences, November 15, 1935, page 470.